United States Patent [19]

Gross

[11] Patent Number: 5,185,953
[45] Date of Patent: Feb. 16, 1993

[54] RODENT EXTERMINATION DEVICE

[76] Inventor: Allen W. Gross, 1122 University Ave., Berkeley, Calif. 94702

[21] Appl. No.: 745,681

[22] Filed: Aug. 16, 1991

[51] Int. Cl.⁵ .............................................. A01M 23/04
[52] U.S. Cl. ......................................... 43/58; 43/70; 43/75; 43/76
[58] Field of Search ................... 43/70, 71, 72, 75, 77, 43/78, 58

[56] References Cited

U.S. PATENT DOCUMENTS

| 25,179 | 8/1859 | Crane | 43/75 |
|---|---|---|---|
| 997,189 | 7/1911 | Grierson | 43/76 |
| 1,115,681 | 11/1914 | Keltonik | 43/58 |
| 1,198,332 | 9/1916 | Crisler | 43/75 |
| 1,464,697 | 8/1923 | Connolly | 43/75 |
| 1,573,185 | 2/1926 | Ney | 43/58 |
| 2,107,080 | 2/1938 | Mitchell | 43/70 |
| 2,247,931 | 7/1941 | Vincent | 43/76 |
| 4,483,094 | 11/1984 | McKee | 43/75 |
| 4,550,524 | 11/1985 | Goebel | 43/75 |
| 4,741,121 | 5/1988 | Pratscher | 43/58 |

FOREIGN PATENT DOCUMENTS 358154  9/1922  Fed. Rep. of Germany .......... 43/75

*Primary Examiner*—Kurt C. Rowan
*Attorney, Agent, or Firm*—Bielen, Peterson & Lampe

[57] ABSTRACT

A rodent trap that is constructed with a housing having a rodent entry and containing a launching mechanism that is activated by a photo sensor when a rodent enters the housing, the launching mechanism ejecting the rodent through an opening in the top of the housing and into a receptacle for disposal.

3 Claims, 2 Drawing Sheets

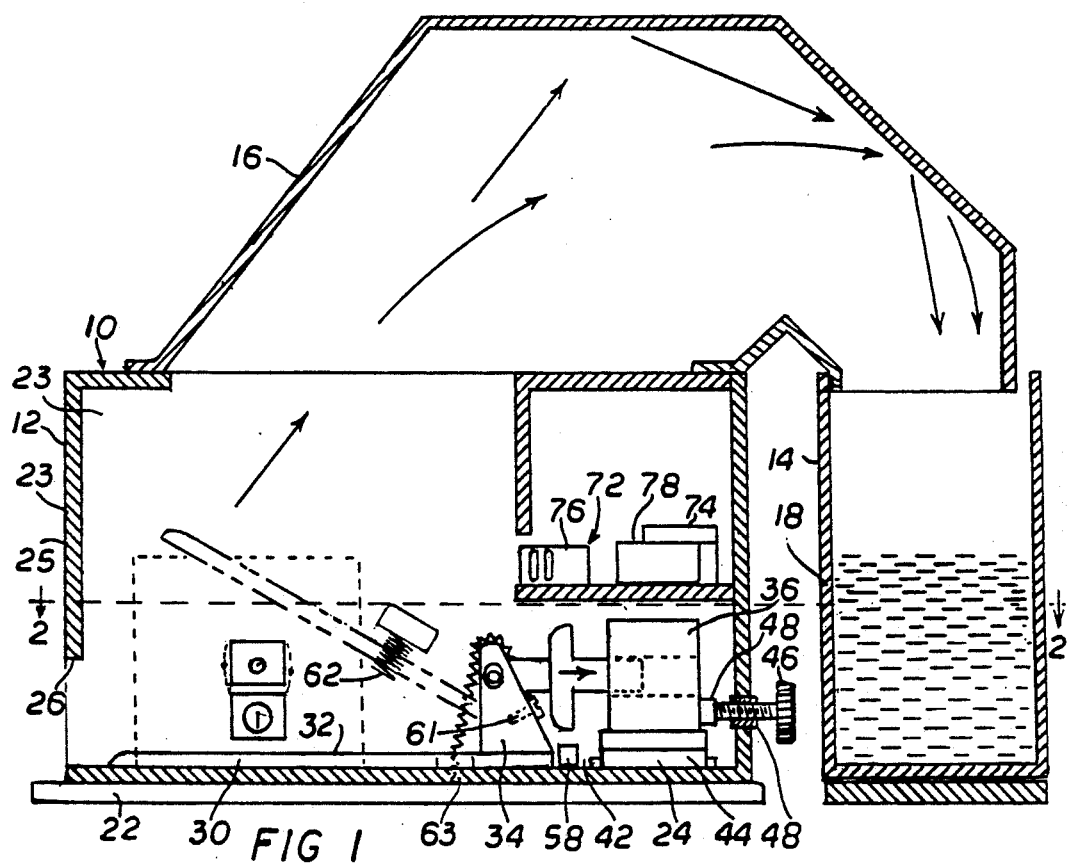
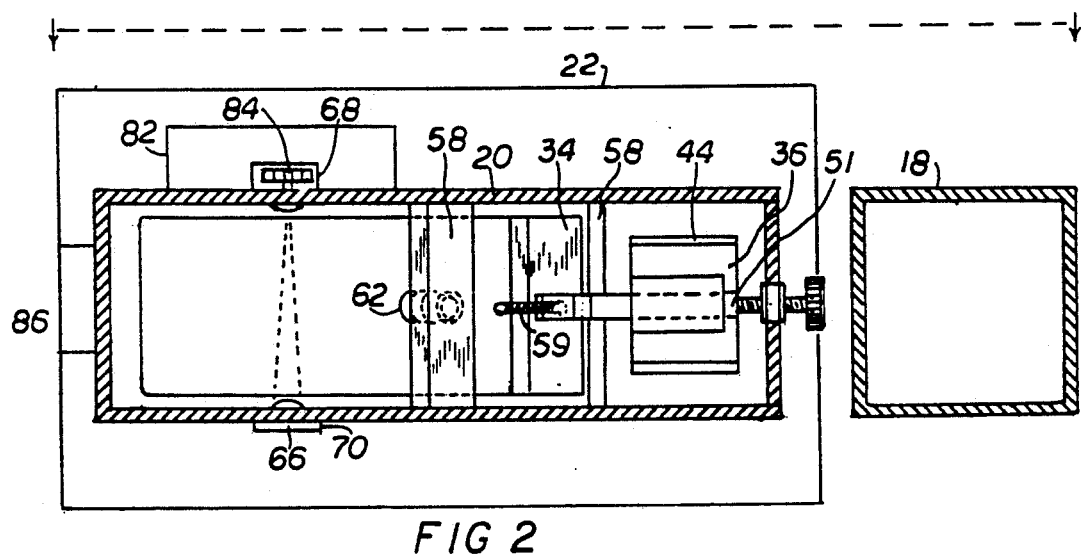

RODENT EXTERMINATION DEVICE

BACKGROUND OF THE INVENTION

This invention relates to a rodent extermination device and is designed to capture small rodents particularly mice and rats. The device is designed to be operable for a range of rodent sizes, however, it is to be understood that for very large rats and other larger animals, the device can be sized proportionally to the animal desired to be captured. Although the rodent extermination device can be directed against many of the order of rodentia the device is designed primarily for capture of members of the muridae including the genius rattus and mus because the capture involves a physical shock to the rodent, it is not recommended that the device of this invention be used for capture of benign animals that are to be preserved or relocated.

The problem of ridding areas of rats and mice has plagued man kind for centuries. Thousands of different devices for the capture and/or extermination of these rodents has resulted in the cliché about the better mouse trap. While many of the devices proposed in the past are effective, they usually have one or more drawbacks that limit their use. It has been reported that their are over 3,300 different mouse trap patents that have issued from the U.S. Patent and Trademark Office. Yet, the problem of rodent infestation continues which causes not only hazards to health and welfare but agriculture damage totalling millions of dollars per year. For example, in certain industries subject to rat infestation, crop losses can approach 5-10% of the potential crop.

Many prior art designs rely on the capture of a rodent in a trap and subsequent release of the rodent or disposal of the trap and rodent after capture. However, these types of devices can generally only capture one rat at a time. Other devices have been constructed that attempt capture of rats or mice, however, effectiveness is often diminished by the signaling of captured rodents. Other devices that capture or kill a trapped rodent lose their effectiveness because the panic of capture or the scent of death is detected by other rodents after the traps are emptied with the rodent. Rodents sensing or detecting the prior capture or kill are deterred from entering the reused trap.

Key to the success of the subject invention is the sudden displacement or launch of a rodent from the site of initial capture to the site of containment. In this manner, before the rodent detects anything amiss as he approaches bait, he triggers the actuating mechanism and is launched to a common container. As the common container is displaced from the triggering mechanism, there is nothing at the locus of the triggering mechanism to deter repeated investigations by other rodents in the area. The containment structure can be a receptacle for receiving a series of rats for removal to another site or can be a vessel for exterminating rats on-site. For example, in many situations where health is at issue, it is often desirable that the rodents be captured alive to retain the fleas, lice or other blood-sucking insects on the host for subsequent examination or extermination in a process that insures that the parasites are destroyed along with the host.

The device of this invention can be used repeatedly and includes and automatic resetting mechanism such that the repeated operation of the device can be accomplished without direct monitoring of the device.

SUMMARY OF THE INVENTION

The rodent trap of this invention comprises a capturing device for capturing a plurality of rodents with a mechanism that launches the rodent from the site of capture to a site of imprisonment or extermination. Key to this invention is a catapult assembly that includes a detection sensor to detect the presence of the rodent and trigger a launch mechanism. The catapult assembly has a catapult paddle that is actuated by a launch mechanism solenoid upon activation by an electronic impulse triggered by interruption of a photo sensor.

In the preferred arrangement, the capture component is displaced from the containment component a sufficient distance, such that any scent that is emitted from the panic of containment or the process of extermination remains at the site of containment and does not effect the site of capture. In this manner, the capture apparatus can be repeatedly actuated, launching the captured rodent to the containment component allowing only periodic inspection and removal of imprisoned or exterminated rats.

The capture component comprises an apparatus having a housing that is box like in configuration with an opening in one of the bottom corners for entry of the rodent. The housing has a long and narrow base mounted on a support platform with an actuating mechanism at one end connected to an elongated catapult paddle extending to the other end where the access opening is located. Between the access opening and the actuator mechanism is a photo sensor that senses the presence of the rodent on the catapult platform. Once sensed an electrical impulse is sent to an electronic circuit which causes the large solenoid of the actuating mechanism connected to a fulcrum point on the catapult paddle to actuate the paddle and launch the rodent upwardly and out a top opening in the housing structure. Preferably the housing structure includes a guide to direct the airborne rodent to the containment container. The launching mechanism can be adjusted for the expected size and weight of the rodents sought to be captured such that a predictable launch trajectory can be determined for placement of a conventional receptacle that functions as the containment component when the shroud is not used. The containment component can comprise a vessel with smooth walls. When the vessel is partially filled with water the rodent is drowned in the containment vessel. Because the actuating mechanism can be adjusted to respond to a peak current surge, an extremely rapid firing can occur such that the rodent is dazed or debilitated by the rapid acceleration of the launch. This deactivation of the rodent may also have an effect on the inability to signal that the situation in which the rodent has found itself is one that should be avoided by other rodents.

The capture component requires access to an AC or DC power source in order to provide the necessary electrical power for the sensing, triggering, and actuation circuits. The containment component can be any containment vessel such as a five gallon bucket, a drum, or a larger container that enables collection and subsequent removal or disposal of the captured rodents. These and other features of the preferred embodiment will be described in greater detail in the detailed description of the preferred embodiment.

BRIEF DESCRIPTION OF THE DRAWINGS

FIG. 1 is a cross-sectional, side-elevational view of the rodent trap.

FIG. 2 is a cross-sectional view taken on the lines 2—2 in FIG. 1.

DESCRIPTION OF THE PREFERRED EMBODIMENTS

Figure 3:
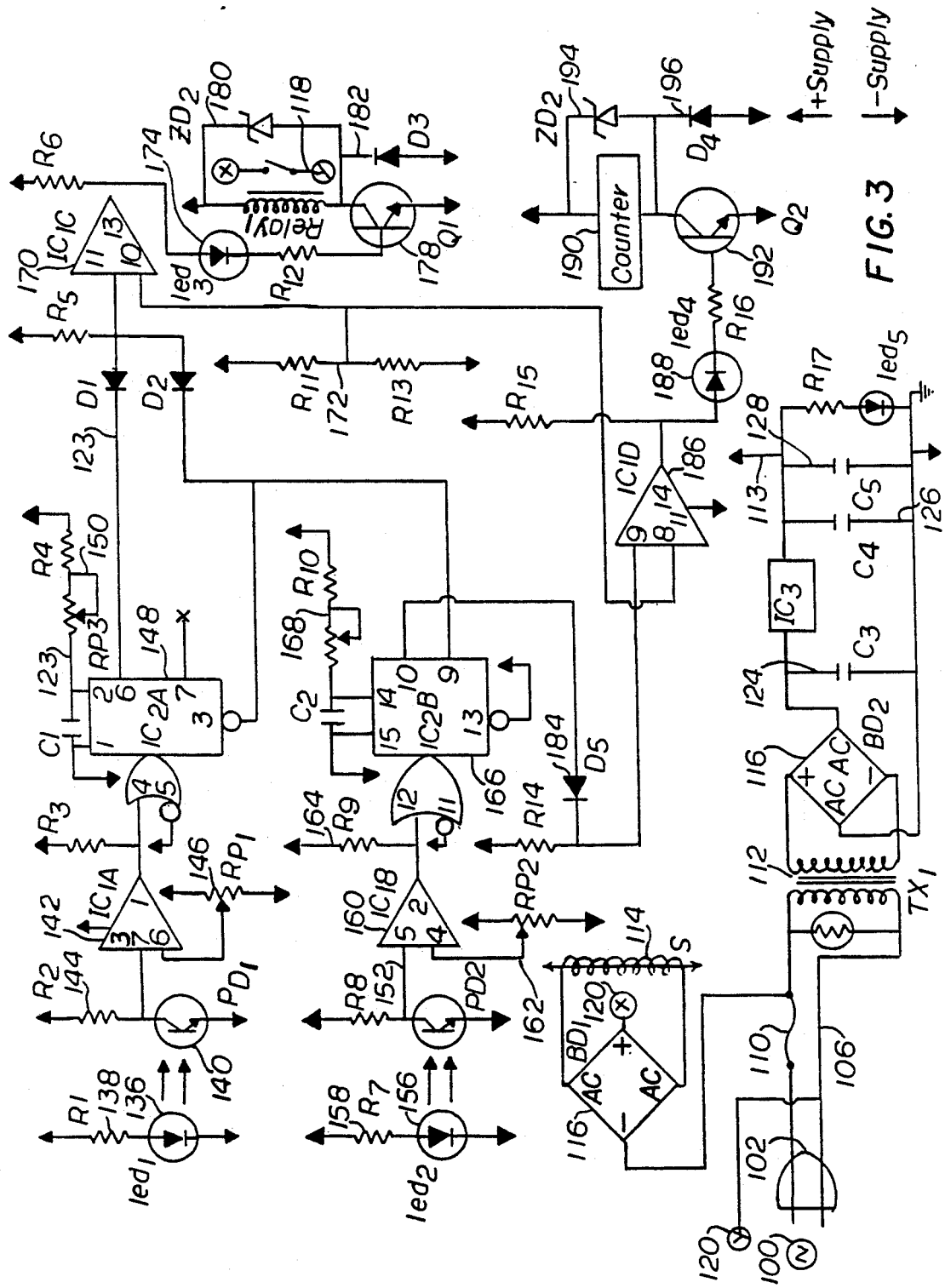
FIG. 3 is an electrical semantic diagram of the circuitry for the rodent trap of FIG. 1.

Referring to FIG. 1, the rodent trap, designated generally by the reference numeral 10 is shown as an intergraded unit with a capturing component 12 and a containment component 14. In the preferred embodiment of FIG. 1, the capturing component and containment component are joined by a covering shroud 16 which seats on top of the capturing component 12 and extends over to the containment component 14. In operation, the shroud 16 assists in guiding a launched rodent from the capturing component 12 to the containment component 14. The containment component 14 comprises a square basket that is partially filled with water. A rodent that is launched from the capturing component and deflected by the shroud 16 into the water filled receptacle 18 fully expires by drowning. When a shroud is not employed in the rodent trap, a containment component can be displaced by a greater distance from the capturing component and may comprise any receptacle such as a garbage pail, debris or other unit. The trajectory of the rodent must be calculated or determined by trial, such that the receptacle is properly positioned to receive the rodent.

The capturing component 12 is constructed with a housing 20 that has a base 22 and sides 23, one end side 25 an end opening 26 for entry of a rodent and a top opening 28 for ejection of the rodent from the capturing component. The capturing component has an ejection or catapult assembly 24 within the housing 20 for launching a rodent detected within the housing to the receptacle. The catapult assembly 24 includes a catapult paddle 32 having a fulcrum block 34 connected to an actuating mechanism 36 by a elongated pin 38. The actuating mechanism 36 includes a large sucking solenoid 40 and a base plate 42 mounted in a slide mount 44 allowing the solenoid to be adjustably positioned by a thumb screw 46 mounted through a pivotal guide 48 in the housing 20 with a threaded end 50 engaging a threaded bore member 52 on the base plate 42 of the solenoid. The solenoid 40 has a displaceable core member 56 that is retracted on activation of the solenoid drawing the catapult paddle 32 against a fulcrum stop 58. Adjustment of the thumb screw 46 effectively adjusts the stroke of the core member 56. When activated the actuating mechanism draws the catapult mechanism 30 against the stop 58 as shown in phantom in FIG. 1 causing the paddle 32 which is a platform on which a rodent is situated to pivot against the stop and quickly arc until the paddle contacts a cross bar 60 having a compression spring 62 that acts as a stop. The arcuate displacement of the paddle 32 launches any object that is located on the platform paddle. A coil spring 59 anchored by screw 61 atone end to the block 34, passes over the block and through a hole in the paddle to be anchored by screw 63 in the base 22. This spring 59 insures that the paddle is returned to the base 22.

The actuating mechanism 36 is activated by a triggering assembly 64 includes a sensing means. The sensing means is preferably a photo optical sensor 66 which includes a light emitting diode 68 and an oppositely mounted photo electric sensor 70 mounted on the sides of the housing 20 such that a light beam is passed across the inside of the housing 20 just above the middle of the paddle 32. The triggering assembly 64 includes electronic circuitry such that a break in the light beam will trigger the discharge of activating current to the sucking solenoid 40 causing the solenoid to retract. The circuitry 72 includes such components as an ac/dc rectifier 74, a relay 76 and a storage capacitor 78 shown in FIG. 1 mounted on a platform 80 in the housing 20 above the sucking solenoid 40. In addition to the activating circuitry 72 the preferred embodiment of the rodent trap 10 includes a counter 82 mounted on the outside of the housing 20. The counter has a display 84 and protective internal circuitry to insure that the reading on the counter display 84 is an accurate count of actuations that have occurred during a reading period. The counter enables the trap to be utilized in rodent extermination services where compensation is in part based on the number of rodents exterminated. The counter provides an accurate check to determine that the reported number of rodents exterminated matches the actuation count of the device.

Rodent trap 10 can be aided by an appropriate bait that provides an aroma, particularly in the warmed by the discharged heat of the windings of the sucking solenoid 40, the relay 76 and the rectifier 74. Together with a small internal light 84, the warmth and aroma emanating from the trap create an attractive ambiance for inducing entry of a rodent through the housing entry. To accommodate the rodent, a ramp 86 is cut into the support base 22 and bottom of the housing 20 to improve access. As noted, the actuating mechanism operates with such speed that a rodent is unable to react to the thrust of the pivoting paddle 32 and is upwardly launched toward the shroud 16 where it is guided into the receptacle 18.

Referring now to FIG. 3, the circuitry that enables the efficient operation of the catapult assembly is shown. Power from an a.c. source 100 is transmitted through a plug 102 and cord 104 of an a.c. power supply line 106 protected by an oxide resistor 108 and fuse 110. The supply line 106 is connected to a step down transformer 112 to provide a 24 V power supply for conditioning for the controller circuit power line 113. The a.c. power supply line 106 is also connected to a sucking solenoid 114 after being rectified to 110 d.c. by d.c. rectifier 116. Operation of the sucking solenoid is controlled by a triggering circuit 118 across terminals 120 and switch 122.

The triggering circuit 118 is switched by the controller circuit 123. The controller circuit 123 is powered by the controller circuit power line 113 which is the 24 V power supply conditioned by bridge rectifier 125 and capacitor 124 and regulated to 12 v.d.c. by regulator 126. The 12 v.d.c. power line 113 includes capacitor line filters 128, 130 to prevent oscillations. The positive 12 v.d.c. line 113 is designated by the up terminal 132 and the ground line by the down terminal 134 throughout the schematic of FIG. 3.

The controller circuit 123 is a general term for the various low voltage subcircuits that insure proper operation and accounting of the functioning device. Once set and disposed in the field, activation is initiated by a rodent entering well within the trap 10 on the paddle 32.

A "superbright" light emitting diode 136, of intensity set by resistor 138, directs a light beam across the paddle 32 at a photoelectric sensor 140. The sensor 140 is part of a trigger circuit feeding one section of a quad comparator 142, line resistor 144 and trim pot 146 for adjustment of sensitivity.

The quad comparator 142 connects to a single shot integrated chip 148. The single shot I.C. 148 generates a timed firing pulse with the duration controlled by potentiometer circuit 150. To insure that the sucking solenoid is ready to be refired, a reset sensor circuit 152 is included to provide the proper conditions at And gate 154. The sensor circuit 152 is activated by a light emitting diode 156 that generates a light beam of intensity set by resistor 158 that is interrupted when the displaceable core 56 of the sucking solenoid 40 has retracted blocking the beam. The signal change is detected by a second section of the quad comparator 160 with a sensitivity trim pot 162 and main bias resistor 164 for triggering an associated single shot integrated chip 166 for generating a timed firing pulse with a duration controlled by potentiometer circuit 168. The pulse of chip 166 is approximately a second and substantially greater than the pulse of chip 148. If either diode 1 or diode 2 is low, the triggering circuit for the sucking solenoid 114 will not fire. Both D1, and D2 of and gate 154 must be high as detected by a third section of quad comparator 170 and compared with a 6 volt reference voltage at resistor tree 172. When quad comparator 170 fires and lights monitor light emitting diode 174 and actuates relay 176 through transistor 178 and protective zener diode 180 and diode 182. When relay 176 trips switch 122 the high voltage drive current is passed through the windings of the suction solenoid 114 actuating the solenoid.

The reset sensor circuit 152 also provides a pulse signal from the integrated one-shot chip 166 through diode 184 for comparison with the 6 volt reference voltage from the resistor tree 172 in the last section of the quad comparator 186. When the comparator 186 fires it lights light emitting diode 189 and actuates the counter 190 through grounding transistor 192. The counter includes circuit protection zener diode 194 and line diode 196.

By appropriate adjustment of the trim controls, the power to the actuating solenoid can be controlled to vary the triggering relay duration for variation in the throw of the paddle to accommodate different classes of rodents of different weight or different launch trajectories. Additionally, the trim controls insure that the paddle on returning to initial position does not again reactivate the solenoid on cutting off the light beam during return.

A list of the components utilized is shown in Table 1 below.

TABLE OF COMPONENTS

| RESISTORS | | DIODES | | BRIDGES RECTIFIERS | |
|---|---|---|---|---|---|
| R1 | 370 1/2 WATT | D1 | IN914B | BD1 | 25A 400V |
| R2 | 100K | D2 | IN914B | BD2 | 1A 50V |
| R3 | 2.7K | D3 | IN4001 | PHOTO DETECTOR | |
| R4 | 33K | D4 | IN4001 | D1 IR PHOTO TRANSISTORS | |
| R5 | 10K | D5 | IN914B | D2 IR PHOTO TRANSISTORS | |
| R6 | 2.7K | LEDS | | | |

-continued

TABLE OF COMPONENTS

| R7 | 370 1/2 WATT | LED 1 Super Brite Infa Red Led | |
|---|---|---|---|
| R8 | 100K | LED 2 Super Brite Infa Red Led | |
| R9 | 2.7K | LED 3 Red Led | TRANSISTORS |
| R10 | 33K | LED 4 Red Led | Q1 Tip 31 C |
| R11 | 100K | LED 5 Red Led | Q2 Tip 31 C |
| R12 | 2.7K | POWER CIRCUIT | |
| R13 | 100K | Relay 12V 100 ohm Coil 30A contacts | |
| R14 | 10K | S1 120VAC Solenoide | |
| R15 | 2.7K | | |
| R16 | 2.7K | | |
| POTS | | INTERGRATED CIRCUITS | |
| Rp1 100K 1/4 WATT | | IC 1 LM339 Quod Volt Comp | |
| Rp2 100K 1/4 WATT | | IC 2 4524B 4098 Dual Single Shot Resetable | |
| Rp3 1 meg 1/4 WATT | | IC 3 7812 Pos 12 Volt Regulator | |
| ZENNERS | | CAPICITOR | |
| ZD1 15 V 1/2w | | C1 2.2 UF 25V | |
| ZD2 15 V 1/2w | | C2 25 UF 25V | |
| | | C3 1000 UF 35V | |
| | | C4 .1 UF 25V Tan | |
| | | C5 470 UF 25V | |

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A rodent trap comprising:
  a) a housing having a base, sides and a top with an end side having a structural opening means for allowing entry of a rodent and the top having a structural opening means for allowing ejection of a rodent that has entered the housing;
  b) a ejection assembly having a launching means with a platform on which a rodent is supported for ejecting the rodent through the top structural opening means, an actuating means connected to the platform for displacing the platform, and a triggering means for activating the actuating means, the triggering means having a sensing means for sensing the presence of a rodent on the platform;
  c) a receptacle means for receiving a rodent ejected from the housing on activation of said actuation means, wherein:
    (1) the ejection assembly comprises a catapult paddle that forms the platform, the paddle having an end with a pivot means connected to the actuating paddle having an end with a pivot means connected to the actuating means for pivoting the paddle from the end having the pivot means and the housing having a paddle stop mounted on the housing that contacts the paddle and limits the range of pivot on actuation, the stop including spring means for cushioning the paddle on stopping and aiding the return of the paddle, and;
    (2) the actuating means includes a sucking solenoid having a displaceable core element connected to the pivot means for pivoting the paddle on triggering.

2. A rodent trap comprising:
  a) a housing having a base, sides and a top with an end side having a structural opening means for allowing entry of a rodent and the top having a structural opening means for allowing ejection of a rodent that has entered the housing;

b) a ejection assembly having a launching means with a platform on which a rodent is supported for ejecting the rodent through the top structural opening means, an actuating means connected to the platform for displacing the platform, and a triggering means for activating the actuating means, the triggering means having a sensing means for sensing the presence of a rodent on the platform;

c) a receptacle means for receiving a rodent ejected from the housing on activation of said actuation means;

d) a counter means connected to the electronic circuit for counting the number of actuations that occur; and, e) means for adjusting the trajectory of an object on activation of the actuating means, wherein:
  (1) the triggering means comprises an electronic circuit and said actuating means comprises a sucking solenoid connected to the platform, the electronic circuit being electrically connected to the solenoid to actuate the solenoid on sensing the presence of a rodent on the platform;
  (2) the sensing means comprises a light beam sensor unit arranged to project a sensing light beam across the platform; and,
  (3) the means for adjusting the trajectory comprises a slide mount engaging the solenoid and a thumb screw means engaging the solenoid for displacing the solenoid in the slide mount.

3. A rodent trap comprising:

a) a housing having a base, sides and a top with an end side having a structural opening means for allowing entry of a rodent and the top having a structural opening means for allowing ejection of a rodent that has entered the housing;

b) a ejection assembly having a launching means with a platform on which a rodent is supported for ejecting the rodent through the top structural opening means, an actuating means connected to the platform for displacing the platform, and a triggering means for activating the actuating means, the triggering means having a sensing means for sensing the presence of a rodent on the platform, the sensing means comprising a light beam sensor unit arranged to project a sensing light beam across the platform;

c) a receptacle means for receiving a rodent ejected from the housing on activation of said actuation means, wherein the ejection assembly comprises a catapult paddle that forms the platform, the paddle having an end with a pivot means connected to the actuating means for pivoting the paddle from the end having the pivot means, and wherein the actuating means includes rapid fire means for rapid acceleration of the catapult paddle for launching a rodent on the paddle with an airborne trajectory, wherein the triggering means comprises an electronic circuit and said actuating means comprises a sucking solenoid, connected to the platform with the electronic circuit being electrically connected to the solenoid to actuate the solenoid of sensing the presence of a rodent on the platform, the actuating means having means for adjusting the trajectory of an object on activation of the actuating means, wherein the means for adjusting the trajectory comprises a slide mount engaging the solenoid, a thumb screw means engaging the solenoid for displacing the solenoid in the slide mount and circuit control means in the electronic circuit for regulating actuation of the solenoid, and, d) counter means connected to the electronic circuit of the triggering means for counting the number of actuations that occur.

* * * * *